Aug. 20, 1963   J. B. WILLIAMS   3,101,035
CAMERA ATTACHMENT
Filed Sept. 16, 1960

INVENTOR.
JOHN B. WILLIAMS
BY
Robinson & Berry
ATTORNEYS

United States Patent Office 3,101,035
Patented Aug. 20, 1963

3,101,035
CAMERA ATTACHMENT
John B. Williams, 1420 4th Ave., Seattle, Wash.
Filed Sept. 16, 1960, Ser. No. 56,384
1 Claim. (Cl. 95—86)

This invention relates to cameras and more particularly to what will herein be designated as a "camera attachment." More specifically stated, the present invention comprises a "pistol grip" type of handle mechanism, designed for easy and ready attachment to a certain small sized motion picture camera, as a means for holding it for picture taking and embodying means therein that is operable for starting and stopping the film strip winding mechanism.

It is the principal object of the present invention to provide a device of the above stated character that can be easily and readily applied to the camera for use; that is of practical and long lasting construction; that includes therein a mechanism that is operable while said handle portion is gripped by one hand, for the starting and stopping of the film winding mechanism of the camera and which device can be easily and readily removed from the camera to permit the mounting of the camera on a tripod if such should be desired.

A further object of the invention is to provide a handle device of the character above stated wherein a lever is pivotally supported for actuation by the camera user for the easy and convenient starting and stopping of the film winding mechanism of the camera.

Still further objects and advantages of the invention reside in the details of construction of the various parts of the attachment, in their assembly and in their mode of operation, as will hereinafter be fully described.

In accomplishing the above mentioned and other objects of the invention, I have provided the improved details of construction, the preferred forms of which are illustrated in the accompanying drawings, wherein.

Figure 1:
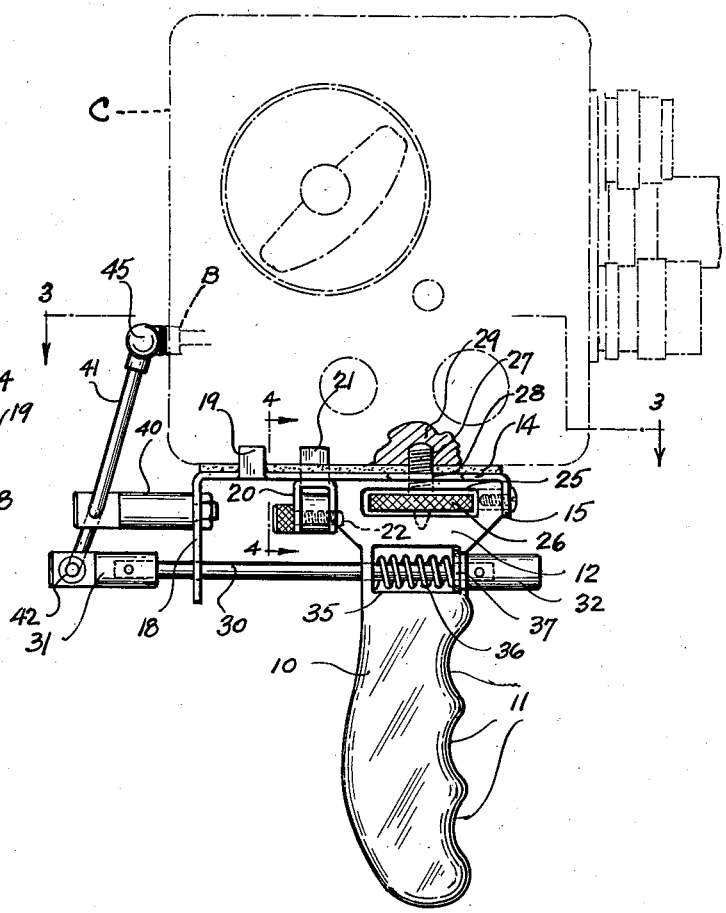
FIG. 1 is a side view of the present attachment device as applied to a motion picture camera which has been indicated in outline in dash-dot lines.

Referring more in detail to the drawings:

In FIG. 1, the present attachment device has been shown in full lines as attached for use to a well known make of small sized moving picture camera, which has been shown in dash-dot line showing and designated by reference character C.

The attachment device comprises a handle, or hand grip portion 10 of pistol grip form which is disposed in a substantially vertical position when functionally applied to the camera. This handle portion is formed along its forward edge, with a succession of finger seating notches 11 and at its upper end has a slightly enlarged head portion 12, formed with a flat, horizontal top surface upon and against which a camera mounting plate 14 is flatly disposed and secured. The plate 14 is provided at its forward end with a downturned wing 15 that abuts flatly against the forward end face of the handle head portion 12 and is secured thereto by screws 16 applied through the wing and into the head.

Figure 4:
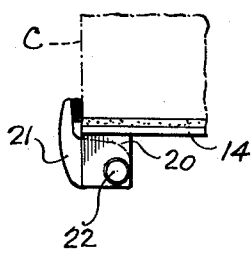
FIG. 4 is a sectional detail, taken on the line 4—4 in FIG. 1.

At its rearward end, the flat plate 14 is formed with a downturned wing or flange 18, and at one side and near the rear end thereof has a small upturned ear 19 and at the underside of its opposite side edge, the plate mounts an inverted, U-shaped yoke 20 between the arms of which yoke an angular latch member 21 is pivotally mounted, on a horizontal pivot pin 22, extended between the yoke arms as best shown in FIG. 4.

Formed through the upper end, or head portion of the handle 10, transversely of the longitudinal direction of the plate 14 as applied thereto is a passage 25. Contained in this passage is a wheel 26 in which a mounting shaft 27 is coaxially fixed. This shaft extends upwardly from the wheel and head through a hole 28 in the plate 14 and is threaded, as indicated at 29 in FIG. 1, in the base portion of the camera C. The wheel 26 is of such size that its opposite side edges project slightly from the passage 25 and may be grasped between thumb and forefinger for easy turning thus to thread the shaft 27 into or from the camera base.

Extended horizontally through the upper end portion of the handle 10, for limited endwise movement, is a push rod 30 which has its rear end portion guided slidably through a hole in the downturned flange 18. At its rearward end, a cylindrical block 31 is fixed coaxially to the rod 30 and at its forward end, a similar block 32 is fixed thereto against which the fore finger of the hand gripping the handle 10 can be pressed to shift the rod 30 from a forward position to a rearward position for starting the film winding action of the camera.

In its sliding passage through the handle, the horizontal rod 30 passes through a transverse handle opening 35. A coil spring 36 is applied about the shaft within this opening 35 and is retained under compression between one of the end walls of the opening 35 and against an annular shoulder 37 formed on or fixed to the rod, thus to yieldably retain the rod in its retracted position.

Mounted in the downturned flange 18 of the plate 14, above the level of rod 30 and extended rearwardly therefrom in the direction of the rear end of rod 30 is a rigidly mounted stub shaft 40 in which a lever 41 is pivotally mounted for swinging action in a vertical plane. At its lower end, the lever 41 is pivotally attached, as at 42, to the rear end of block 31, and at its upper end this lever mounts a round head 45 that rests lightly against the push button B of the camera for controlling the film winding action.

Figure 2:
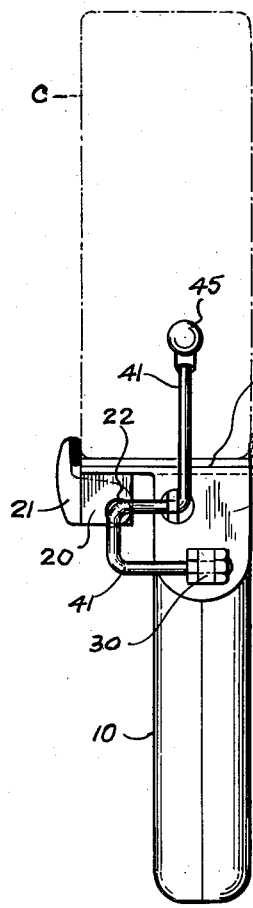
FIG. 2 is a rear end elevation of the present attachment device as applied to the camera.
Figure 3:
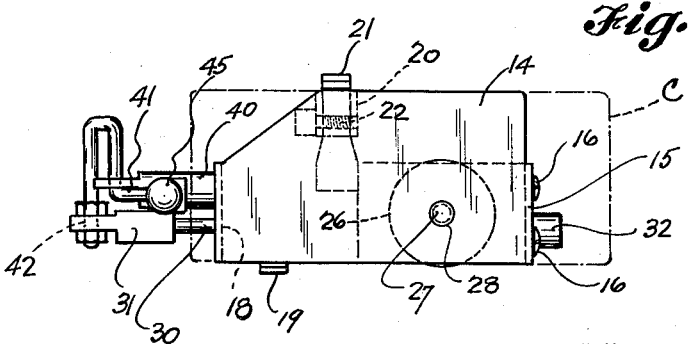
FIG. 3 is a top view of the attachment device.

It is to be understood that in the application of the present attachment device to the camera, the plate 14 is placed flatly against the bottom of the camera, with the ear 19 and clip 21 engaged against opposite side edges thereof as indicated in FIGS. 2 and 3, the screw shaft 27 is passed upwardly through plate 14 and threaded into the camera base, as shown in FIG. 1, with the head 45 of lever 41 engaged lightly against the starting button B of the camera.

Assuming the device to be so constructed and applied to a camera in the manner described, its use is as follows:

The camera is held for use by grasping the handle in one hand in such manner that the forefinger of that hand can be applied against the forward end of the head block 32 of the push rod 30. The finger notches 11 of the handle provide for maintaining a firm non-slipping hold on the handle. The position of the attachment device when properly fixed to the camera, is such as to place the upper end member of the lever properly against the starting button B, with the camera held properly in position, when the operator desires to start a picture taking operation, he presses inwardly on the head block 32 of push rod 30 and this operates through action of the pivotally mounted lever 41 to press the starting button B inwardly and thereby set the film winding mechanism in operation. When this finger pressure is removed, the spring 36 expands and moves the rod 30 and lever 41 to a retracted position and the winding mechanism is thereby automatically stopped.

Devices of this kind, although made for use with cameras of a certain make and design, may be adapted, by changes, not requiring invention, for use with cameras of other types and models. Materials employed may be varied and refinements may be made without departing from the spirit of the invention.

What I claim as new is:

A holding and a starting mechanism for a camera of the character described having a starting button at the back side thereof and having an internally threaded socket directed upwardly into its bottom surface for reception of a camera mounting screw; said mechanism comprising a handle of pistol grip formation, having a head portion with a flat top surface, a camera mounting plate secured flatly on said top surface and extending rearwardly from the handle and terminating at that end in a downturned flange, a spring biased push rod extending slidably through the handle adjacent its head portion for limited endwise movement with its rear end portion extending slidably through the downturned flange of said camera mounting plate and its forward end portion extending from the handle for finger actuation of said rod, a stub shaft rigidly mounted in and extending rearwardly from said flange at a point above the push rod, a lever pivotally supported at a point between its ends by said stub shaft with its lower end pivotally connected with the rear end of said push rod and having its upper end disposed in position to act against said starting button for camera operation; said camera mounting plate having an opening therein in its forward portion and formed at one side edge with an upturned ear for engaging the camera at one side, and at its opposite side edge pivotally mounts a releasable latch for engaging the camera opposite said upturned ear to coact therewith for retaining the position of the camera on the mounting plate, and a handle attaching screw rotatably fixed in the head portion of the handle and extended upwardly therefrom through said plate opening and threaded into said threaded socket of the bottom surface of the camera for fixed securement of the holding and starting mechanism to the bottom of the camera.

References Cited in the file of this patent

UNITED STATES PATENTS

| | | |
|---|---|---|
| 2,275,644 | Olmstead | Mar. 10, 1942 |
| 2,793,573 | Cuchet | May 28, 1957 |

FOREIGN PATENTS

| | | |
|---|---|---|
| 652,791 | Great Britain | May 2, 1951 |